Dec. 24, 1935.  A. D. OLDS  2,025,302
ELECTRIC COFFEEPOT
Filed Dec. 11, 1933
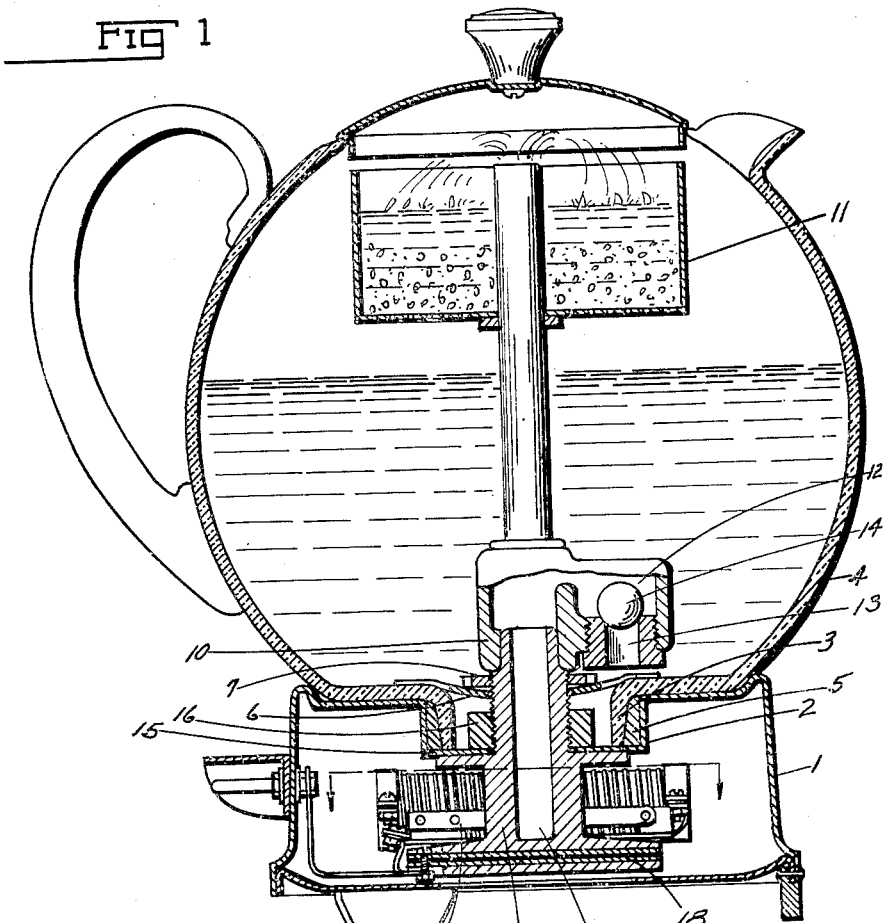
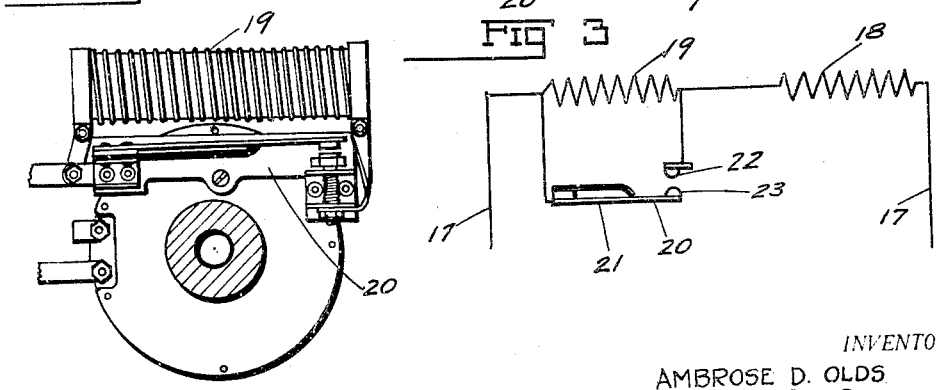
INVENTOR.
AMBROSE D. OLDS
BY B. F. Funk
ATTORNEY.

Patented Dec. 24, 1935

2,025,302

UNITED STATES PATENT OFFICE 2,025,302

ELECTRIC COFFEEPOT

Ambrose D. Olds, Wichita, Kans., assignor to The Coleman Lamp and Stove Company, Wichita, Kans., a corporation of Kansas Application December 11, 1933, Serial No. 701,819

6 Claims. (Cl. 219—44)

This invention relates to beverage makers and particularly to coffee pots of that class generally known as electric coffee pots. The primary object of the invention is to provide means for varying the wattage of the heater to the end that a certain amount of heat will be generated to the beverage and a different amount of heat will be provided to maintain the beverage at a predetermined temperature or at least to approximately that temperature. For example, electric coffee pots usually employ a percolator unit to pump water into a coffee basket so that the water liberates the desirable constituents of the coffee to make a beverage. After the beverage is made, it is desirable to maintain it at a drinkable temperature, so I have provided means for causing percolation and then the means is controlled so that the heat generated will be less than that required for percolation but high enough to maintain the beverage relatively hot.

The novelty of the invention will be understood by reference to the following description in connection with the accompanying drawing in which:

Figure 1 is a vertical longitudinal sectional view through a coffee pot constructed in accordance with my invention, the percolation tube being shown in elevation, Figure 2 is a bottom view of the heating element and resistance associated therewith, and Figure 3 is a diagrammatical view of the wiring circuit.

Referring now to the drawing by numerals of reference, 1 designates a base having a recess 2 to receive the flange 3 of the receptacle 4. The flange 3 is slightly tapered to be received in the tapered packing collar 5 in the recess. The receptacle 4 is held in the recess by a spider or clamp 6 held in place by the nut 7 on the well 8 of the percolator unit. The percolator unit has a well or chamber 9 to the throat of which is connected a tube 10. The tube 10 supports a coffee basket 11 of any general construction so that when the percolator unit is in operation the liquid will be pumped over the coffee and pass through the perforated basket into the receptacle as will be well understood.

Offset with respect to the tube and the well is a chamber 12 having a liquid inlet opening 13 provided with a valve seat to receive the ball valve 14. The liquid in the receptacle enters the well through the chamber 12 and as steam is generated, it lifts the water up into the tube to discharge into the basket. When the water in the well is vaporized to such an extent that the pressure in the chamber preponderates over the hydrostatic pressure of the liquid in the receptacle, the ball is held substantially tight on the seat so that very little if any water can seep into the chamber 12 and into the well. Consequently, to all intents and purposes, percolation ceases, but if the circuit is not broken, the well and percolator unit will become hot enough to boil the beverage and thus drive off the aromatic constituents thereof, so I have provided means whereby at the time of cessation of percolation, a resistance is cut in the circuit so that the wattage consumption of the heater is materially reduced so that instead of completely breaking the circuit to cut out the heater entirely, I reduce its wattage consumption so that the liquid will remain hot but will not boil. To this end the wattage consumption has been balanced with the radiating coefficient of the receptacle and the liquid so that I can maintain the liquid approximately at its predetermined temperature for a relatively long period.

I do not wish to be limited to any particular percolator unit nor to any specific arrangement of mechanism for accomplishing the desired results, for to the best of my knowledge this general idea is novel in my invention.

The well as shown is clamped to the base by the flange 15 and the nut 16, but all the matter heretofore described specifically plays no part in my invention. It is merely illustrated and described to show one embodiment of a device to which my invention is applicable.

The circuit 17 has a heater 18 in series with a resistance 19. Shunted around the resistance 19 is a thermostat 20, the heat resistance element of which is in close proximity to the blade 21 which carries the heater 18 and in close proximity with the resistance 19. When all the parts are assembled and current is supplied to the circuit 17, with the thermostat closed, the current will be shunted around resistance 19 to supply the heater. The heater will heat the well of the percolator unit, beginning percolation at a very low temperature and it will continue to percolate as the temperature of the well is raised until the amount of steam or vapor in the well is increased and the pressure raised to maintain the valve 14 on its seat, when percolation will substantially cease. Of course a little steam may come over the top of the percolator tube but appreciable quantities of water will not. The percolation usually stops before the liquid in the receptacle reaches the boiling point so that no boiled water comes in contact with the coffee, therefore the deleterious constituents of the coffee bean will not be liberated to any appreciable extent.

When the percolator unit reaches a temperature which will prevent practical percolation, the heat responsive element 21 of the thermostat 20 will have become hot enough to break the contacts 22 and 23 so now the current will pass through the resistance 19, reducing the wattage consumption of the heater 18, consequently, the heat supplied to the liquid will be diminished and as heretofore stated, it is intended that the heat supplied will be approximately equal to the heat radiated by the receptacle. In other words, the heat input to the element will be equal to the heat dissipated by radiation, therefore, the coffee will be kept hot after the percolation ceases.

Since the resistance is in close proximity to the heat responsive element of the thermostat it will keep the heat responsive element of the thermostat at approximately the maximum temperature previously generated in the percolator unit so the thermostat will remain open as long as the current flows to the resistance and the thermostat will not restore the current around the resistance until the resistance is deenergized. Therefore, the coffee in the pot would not be raised to the boiling temperature nor could repercolation be established without first cutting out the resistance 19. Of course it is possible that the beverage in the pot might be raised to an abnormal temperature after a long period, but for all practical purposes, the differential between the heat input for the beverage and the heat dissipated by the radiation will be so small that danger of abnormal temperatures within any reasonable time will be practically eliminated.

It is to be understood of course that the heat supplied to the element to maintain it at a drinkable temperature is conducted from the heater through the pump.

What I claim is:

1. A coffee pot comprising a beverage receptacle having a perforate coffee basket above the normal liquid level in the receptacle, a percolator pump in the receptacle discharging into the basket, an electric circuit, a heater in the circuit, a resistance element and a thermostat in the circuit operative in response to heat generated by the heater to cut in the resistance, the heat from the resistance being effective to control the thermostat to maintain the resistance in the circuit.

2. A coffee pot comprising a liquid receptacle, a percolator pump in the receptacle, an electric heater for the pump, an electric circuit for the heater, a resistance in series with the heater, a thermostat shunted around the resistance, the heat responsive element of the thermostat being in close thermal contact with the heating part of the pump and adjacent to the resistance, the arrangement of the parts being such that when the heating part of the pump reaches a predetermined temperature the thermostat will operate to cause current to pass through the resistance to cut down the wattage consumption of the heater and the resistance will maintain the thermostat in open position as long as current is passing through the resistance whereby the heater will maintain the liquid in the receptacle at approximately a predetermined temperature without causing the pump to operate.

3. A coffee pot comprising a beverage receptacle having a perforated coffee basket above the normal liquid level in the receptacle, a percolator pump in the receptacle discharging into the basket the percolator pump having an inlet adapted to be closed in response to the temperature generated in the pump between the inlet and the outlet, an electric circuit, a heater in the circuit, a resistance in the circuit in series with the heater, a thermostat in the circuit shunted around the resistance, the heat responsive element of the thermostat being in close thermal contact with the heating part of the pump and adjacent to the resistance, the arrangement of the parts being such that when the heating part of the pump reaches a predetermined temperature the thermostat will operate to cause current to pass through the resistance, cut down the wattage consumption of the heater and the resistance will maintain the thermostat in open position as long as current is passing through the resistance whereby the heater will maintain the liquid in the receptacle at approximately a predetermined temperature below that required to cause the pump to operate.

4. A cooker comprising a beverage receptacle, a percolator pump having its inlet in the receptacle, an electric circuit, a heater, a resistance element and a thermostat in the circuit operative in response to heat generated by the heater to cut in the resistance, the heat from the resistance being effective to control the thermostat to maintain the resistance in the circuit.

5. A cooker comprising a receptacle, a heater for the receptacle, an electric circuit for the heater, a resistance element in the circuit and a thermostat in the circuit operative in response to heat generated by the heater to cut in the resistance the heater from the resistance being effective to control the thermostat to maintain the resistance in the circuit.

6. A cooker comprising a beverage receptacle, an electric heater therefor, an electric circuit supplying current to the heater, a resistance element and a thermostat in the circuit operative in response to heat generated by the heater to cause the thermostat to cut in the resistance in series with the heater, the thermostat being in close proximity to the resistance so that the heat from the resistance will be effective to control the thermostat to maintain the resistance in series with the heater.

AMBROSE D. OLDS.